United States Patent [19]

Anthony

[11] 4,284,475
[45] Aug. 18, 1981

[54] WEAR SLEEVE FOR CONTROL ROD GUIDE TUBE

[75] Inventor: Andrew J. Anthony, Tarrifville, Conn.

[73] Assignee: Combustion Engineering, Inc., Windsor, Conn.

[21] Appl. No.: 6,605

[22] Filed: Jan. 26, 1979

[51] Int. Cl.$^3$ .............................................. G21C 3/30
[52] U.S. Cl. ..................................... 176/78; 176/76
[58] Field of Search ............................. 176/68, 76, 78

[56] References Cited

U.S. PATENT DOCUMENTS

| 3,791,466 | 2/1974 | Patterson et al. | 176/78 |
| 4,057,468 | 11/1977 | Lunt | 176/76 X |
| 4,119,490 | 10/1978 | Delafosse | 176/71 X |
| 4,124,443 | 11/1978 | Bezold | 176/71 X |
| 4,135,972 | 1/1979 | Anthony et al. | 176/71 X |
| 4,175,004 | 11/1979 | Tabsen | 176/71 |

Primary Examiner—Peter A. Nelson
Attorney, Agent, or Firm—L. James Ristas

[57] ABSTRACT

A wear sleeve for a guide tube in a nuclear fuel assembly, and a method of installing the sleeve. The sleeve is an elongated metal cylinder having an upper portion adapted to be suspended from the upper end of the guide tube, and a lower portion adapted to be permanently deformed into interference fit with the walls of the guide tube whereby the sleeve may be secured against vertical movement. The method of installing the sleeve includes the steps of suspending the sleeve from the upper end of the guide tube, then expanding a selected lower surface of the sleeve until the sleeve is permanently deformed, whereby an interference fit between the sleeve and tube is formed.

11 Claims, 7 Drawing Figures

WEAR SLEEVE FOR CONTROL ROD GUIDE TUBE

BACKGROUND OF THE INVENTION

This invention relates generally to nuclear reactor fuel assemblies and more particularly to providing a wear sleeve in the control rod guide tubes of the assembly whereby vibration of the control rod will not damage the guide tube.

Nuclear reactors of the pressurized water type typically have a core region consisting of a multiplicity of vertically oriented fuel assemblies, each assembly containing a matrix of fuel pins. The assembly skeleton includes a plurality of elongated guide tubes to which are connected grids for supporting the fuel pins, and end fittings for securing the assembly between vertically spaced support plates. The guide tubes also serve as sheaths for control rods which are inserted into the core for the purpose of controlling the heat output of the fuel. An upward flow of liquid is maintained in the guide tube to cool the control rod.

Examination of selected fuel assemblies during the refueling of some reactors of this type has revealed the existence of wear patterns on the inside of the guide tubes at the elevation corresponding to the position of the control rod tip within the guide tube when the rod is in the upper limit of travel, i.e., the unique "withdrawn" position. Such wear behavior has the potential for perforating the guide tubes and weakening them so much that the integrity of the assembly might be in doubt. Significant weakening of the guide tubes is particularly dangerous during refueling when the full weight of the assembly is borne by the guide tubes. Thus, further wear of guide tubes in assemblies that are present in a particular reactor must be prevented, and new assemblies that have been fabricated but not yet loaded into the reactor should be modified to avoid such wear.

Modifying fuel assemblies after they have been in the reactor, or when stored on site prior to placement in the reactor, is a difficult task because the assemblies are typically kept under water. Thus, the modification must be made remotely. Accordingly, the problem addressed by the present invention preferably is solved in a way that is easily adopted for remote modification of worn guide tubes.

SUMMARY OF THE INVENTION

The present invention provides a wear sleeve for a guide tube in a nuclear fuel assembly, and a method of installing the sleeve. The sleeve is an elongated metal cylinder having an upper portion adapted to be suspended from the upper end of the guide tube, and a lower portion adapted to be permanently deformed into interference fit with the walls of the guide tube whereby the sleeve may be secured against vertical movement.

The method of installing the sleeve includes the steps of suspending the sleeve from the upper end of the guide tube, then expanding a selected lower surface of the sleeve until the sleeve is permanently deformed, whereby an interference fit between the sleeve and tube is formed.

After the sleeve is installed in the guide tube, the tube must perform substantially like an unrepaired tube, except of course, it has better resistance to control rod vibration. Accordingly, it is an object of the present invention to provide a sleeved guide tube which does not inhibit the insertion and withdrawal of the control rod within the tube. In addition, the control rod must be sufficiently cooled, and the possibility of corrosion between the sleeve and tube minimized. Furthermore, the sleeve should be compatible with fuel assemblies that are reconstitutable.

BRIEF DESCRIPTION OF THE DRAWINGS

The present invention satisfies these and other objectives, as will be evident from the following description and accompanying drawings in which.

DESCRIPTION OF THE PREFERRED EMBODIMENT

Figure 1:
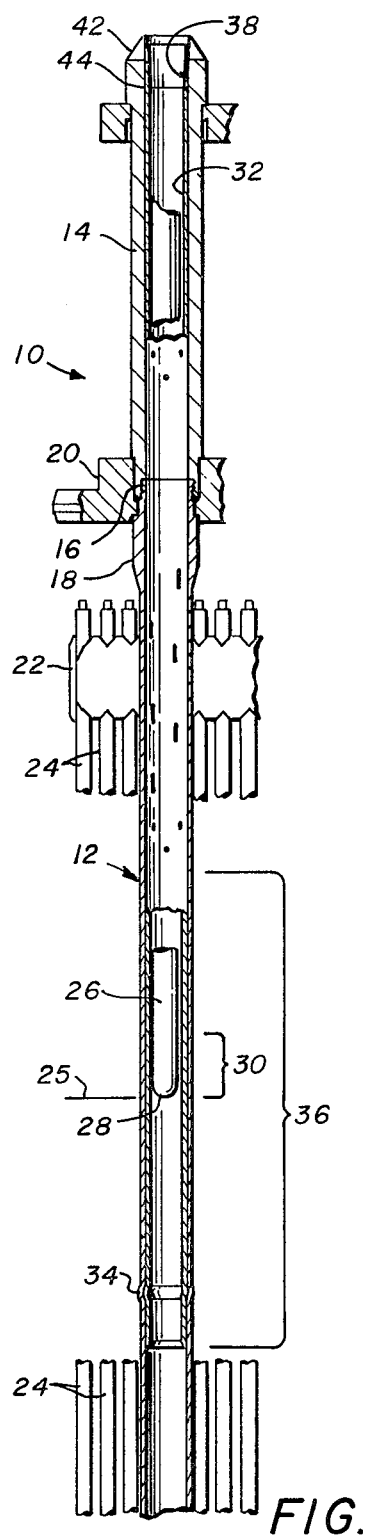
FIG. 1 is an elevation view, partly in section, showing the wear sleeve secured to the guide tube.

FIG. 1 shows a fuel assembly 10 having a plurality of guide tubes 12 (one shown), the guide tube 12 including a post 14 threadedly connected at 16 to an enlarged portion 18 of the tube. An end plate 20 is disposed between the post 14 and the cylindrical portion of the guide tube 12. The assembly 10 further includes grids 22 connected to the guide tube 12 for supporting the fuel pins 24. The fuel pins 24 typically extend parallel to the guide tube 12 and terminate just below the end plate 20. The active, heat-producing material in the fuel rods 24 typically terminates approximately 6 to 10 inches below the top of the fuel 24. The top of the active fuel is designated by arrow 25 in FIG. 1.

The guide tube 12 serves as a sheath for the control rod 26 which telescopingly reciprocates therein. The control rod 26 has a unique upper limit position, typically called the fully "withdrawn" position, whereby the control rod tip 28 is at or above the top of the active fuel 25. In this embodiment of the invention, the withdrawn position is at the same elevation 25 as the top of the active fuel. The control rod 26 may be up to 14 feet long, and is suspended at its upper end from a drive mechanism (not shown) which controls the vertical movement thereof. As a result of the cantilevered support of the control rod 26, and the upward coolant flow through the guide tube 12, the control rod 26 when withdrawn seems to oscillate against the inner wall of the guide tube 12, producing a wear pattern over a critical region 30 of the guide tube 12. The guide tube 12 is particularly vulnerable to contact with the control rod 26 because the typical guide tube material is Zircaloy, which is softer than the Inconel control rod clad.

The present invention provides a method of installing a sacrificial wear sleeve 32 into the upper portion of the guide tube 12 to accommodate the oscillation of the control rod tip 28 and prevent further wear on the guide tube walls. The sleeve 32 is suspended from the post 14 at the upper end of the guide tube 12 and secured to the guide tube 12 by a crimp 34 in which the sleeve 32 and guide tube 12 are permanently deformed. The sleeve 32 remains in place for the lifetime of the assembly 10 but can be replaced in the event the assembly 10 is reconstituted, as described below.

Figure 3:
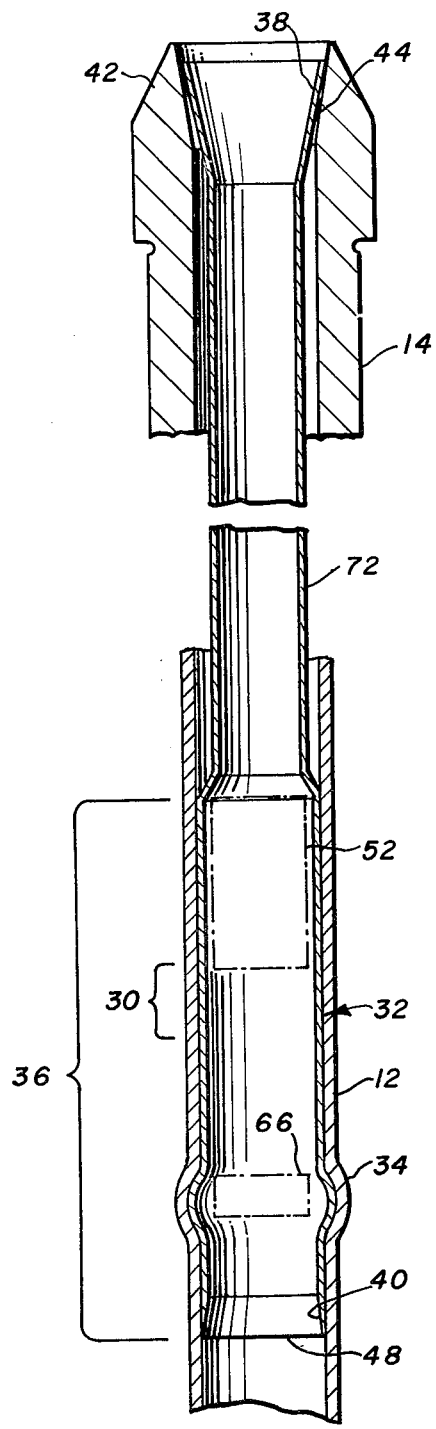
FIG. 3 is a schematic view in section, showing in exaggerated detail the shape of the sleeve as secured to the tube.

In a typical pressurized water reactor the distance from the top of the post 14 to the critical region 30 is between 15 and 24 inches; in the illustrated embodiment this distance is about 22 inches. The guide tube inner and outer diameters are 0.900 and 0.980 inches, respectively, and the control rod outer diameter is 0.816 inches. The length of the sleeve 32 is 27 inches, the lower 10 inches of which are expanded into intimate contact with the guide tube walls, as is best shown in FIG. 3. This embodiment represents a fuel assembly which has been fabricated and may or may not have been present in the reactor, but has not yet experienced any guide tube wear. Thus, the expanded region 36 may extend above the critical region 30 without danger of perforating the guide tube walls. In assemblies 10 that have significant guide tube wear, the sleeve is expanded from the lower end to a point below the critical region 30.

The expansion of the sleeve over region 36 is intended to maximize the flow area between the control rod 26 and the sleeve 32 in the vicinity of the active fuel 24, and improve radial heat flow from the inner diameter of the sleeve 32 to the outer diameter of guide tube 12, particularly when the rod 26 is residing in the active fuel. If the flow area is too small, boiling of the coolant may occur resulting in possible corrosion product build up. It should be understood that, even when the control rod tip 28 is in the withdrawn position, heat is generated therein as a result of neutron absorption in the B-10 atoms of the control rod. The spatial variations of the intensity of the neutron flux above the active fuel may vary with the particular reactor and accordingly, the axial extent of the expanded portion 36 of the sleeve 32 is determined by the axial extent of the need for protection against coolant boiling. As indicated above, it is not recommended that the expansion of the sleeve be made in the critical region 30 if the tube has been weakened due to control rod vibration, depsite the loss of protection against local boiling.

Figure 2:
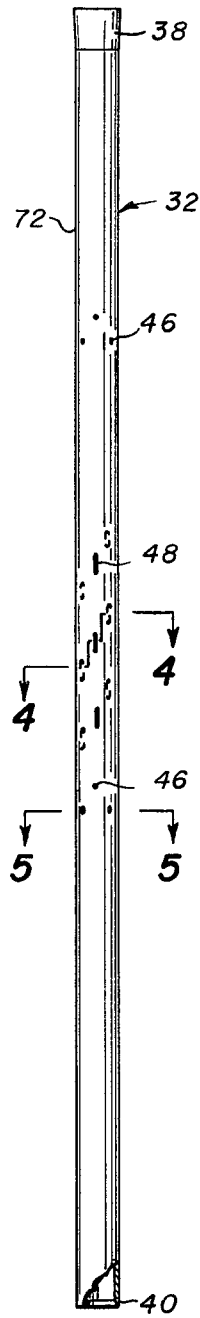
FIG. 2 is an elevation view, partly cut away, showing the wear sleeve before insertion into the guide tube.

FIG. 2 shows the sleeve 32 in detail before insertion into the guide tube 12. The entire inner surface is preferably chrome-plated to a thickness of at least 0.001 inch, especially in the portion of the lower end to be located in the critical region 30. The thickness of the sleeve 32 is about 0.014 inches over the entire length. Except for the upper and lower ends 38, 40 respectively, the inner diameter is 0.863 inches (before plating) and the outer diameter is about 0.890 inches. In order to assure unrestricted vertical movement of the control rod 26 within the sleeve 32, the sleeve should permit a 28 inch long plug having a uniform outer diameter of at least 0.850 inches to pass through unobstructed.

The upper end 38 of the sleeve is conical and adapted to hang from the flared upper end 42 of the post (FIG. 3), which in this embodiment is angled about 4 to 5 degrees from the vertical. Other shapes in which a generally flanged end 38 may be suspended from a stop surface in the upper end 42 of the guide tube 12 or post 14 are also acceptable, so long as the interaction therebetween provides positive support and unique vertical positioning of the sleeve 32 with respect to the tube 12. The present invention does not require that the flare 44 and flange 38 surfaces be attached or mechanically joined. Preferably, the outside surface of the flange 38 is also chrome-plated to resist any wear arising from possible vibration of the flange 38 against the flare 44. This may arise because the flange 38 is not fixedly attached to the stop surface 44 of the tube 12. The intermediate portion of the sleeve 32 has a plurality of coolant flow openings including holes 46 and slots 48, the purpose of which will be explained below. The lower end 40 of the sleeve is tapered in order to reduce the possibility of scratching the control rod 26 as it moves along the discontinuity between the sleeve 32 and the tube 12.

The method of installing the sleeve 32 into the guide tube 12 will be described with reference to FIGS. 1 and 3. It is to be understood that, depending on the history of the particular fuel assembly to be modified, the sleeve installation will be performed from a variety of remote positions. The following description is generic to all installation methods in which there is no direct human contact with the guide tube 12.

First, the sleeve 32 is placed into the upper end 42 of the post 14 so that the flange 38 is suspended from the flared portion 44 of the post. This step locates the tapered end 40 of the sleeve 32 about 5 inches below the critical region 30. The next step is to expand the lower portion 36 of the sleeve 32 into intimate contact with the tube 12. In this embodiment the tube 12 is made of Zircaloy, which has a lower coefficient of expansion than the stainless steel sleeve 32. Since the sleeving operation will be performed at room temperature, the sleeve 32 alone can be expanded so that the maximum diametral gap between the sleeve portion 36 and guide tube 12 is about 0.0025 inches. At operating temperatures (averaging about 590° F), the sleeve 32 will expand more than the tube 12, thereby effecting the intimate contact. The conical upper end 38 of the sleeve will freely rise relative to the post 14, but will not protrude beyond the end 42, since room for expansion has been provided. Although the tube may be permitted to expand slightly as the sleeve is expanded over portion 36, the percent diametral increase in tube strain should not exceed about 0.005.

After the sleeve 32 has been suspended from the flared portion 44 of the post 14, and the sleeve 32 has been expanded over the region 36, the final step in the installation is to mechanically secure the sleeve 32 to the tube 12 below the critical region 30. In the preferred embodiment, the sleeve 32 and guide tube 12 are crimped into a permanent deformation 34 which provides an interference fit therebetween. The crimp 34 is sufficient to provide a large enough resistance to secure the sleeve 32 within the tube 12 during normal reactor operation so that there is no danger of the sleeve 32 loosening as a result of the coolant flow through the tube 12, or of continued control rod vibration. The crimp 34 is not so tight, however, to preclude pulling the sleeve 32 out of the tube 12 in the event the assembly must be reconstituted during a subsequent refueling. The sleeve 32 can be withdrawn from the tube 12 by application of a lift force of about 1500±500 pounds applied on the inner surface of the sleeve 32. Once the sleeve 32 is removed, the post 14 can be unscrewed from the guide tube 12 at connection 16, the end plate 20 removed, and the fuel pins 24 replaced as needed. After reconstituting the assembly, a new sleeve 32 can be installed by the method described herein.

The crimp 34 should be made as low as practicable on the sleeve 32 to avoid the possibility of flutter as the coolant contacts the lower edge 40 of the sleeve 32.

Although the crimp 34 could be centered on the bottom edge 48 of the tapered end 40, it has been found that, with the elastomer expansion plug to be described below, it is preferable to make the crimp 34 about one inch above the edge 48. In the preferred embodiment, the permanent deformation of the tube outer diameter at the peak of the crimp 34 is about 0.015 to 0.035 inches relative to the nominal tube outer diameter on either side of the crimp.

Figure 6:
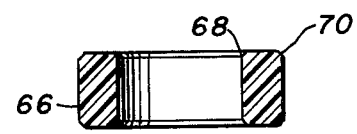
FIG. 6 is a section view of the elastomer expansion plug for forming the crimp connection between the sleeve and the guide tube.
Figure 7:
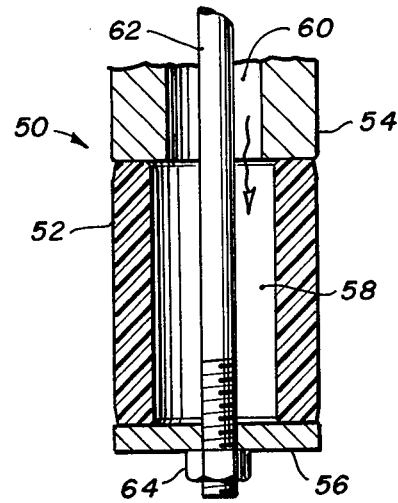
FIG. 7 is a section view of one embodiment of a tool with which an elastomer expansion plug may be mounted prior to insertion into the sleeve.

One technique for expanding the sleeve 32 against the tube 12 over portion 36 and for forming the crimp 34 includes hydroswaging with an elastomer expansion plug of the type shown in FIGS. 6 and 7. The expansion plugs are shown in phantom in FIG. 3. A generally cylindrical tool 50 carrying the expansion plug 52 is inserted into the tube 32 such that the plug 52 is adjacent to the tapered end 40 of the sleeve. The plug 52 is supported in the tool 50 between upper and lower support walls 54, 56 respectively. The interior 58 of the plug 52 is in fluid communication with the conduit 60 of the tool. A stem 62 is threaded at its lower end to engage a nut 64 whereby the lower wall 56 is drawn toward the upper wall 54 prior to insertion of the tool 50 into the sleeve 32. Hydraulic fluid is introduced at high pressure through the conduit 60 into the interior 58, causing the plug 52 to radially expand against the sleeve 32. After the initial plug expansion opposite the lower end of the sleeve 40, the tool 50 is raised one step approximately equivalent to a plug length, and the expansion is repeated. This process continues until the portion of the tube 36 is fully expanded. A suitable expansion plug material is polyether-urethane with a durmeter of 85±5, available as "Methane 1080" from Uniroyal, Inc. An applied fluid pressure of about 1,000 psi was found adequate for expanding the sleeve over portion 36.

After expansion of portion 36 is complete, the tool 50 is removed and another tool carrying the crimp plug 66 shown in FIG. 6 is inserted such that the plug 66 is centered about one inch above the sleeve lower edge 48. The hydraulic pressure is increased to about 2,000 psi, which is sufficient to form a crimp 34 within the desired size. As long as the crimp step is performed at least one inch above the sleeve edge 48, the edge will not recede from the tube wall. After the crimp is made, the tool is removed from the tube and the sleeve operation is complete.

The present invention does not require that the tool 50 be similar to that described immediately above. For example, a tool of the type generally described in the U.S. Pat. No. 4,069,573 issued on Jan. 24, 1978, to G. D. Rogers, Jr., et al, entitled "Method of Securing a Sleeve Within a Tube," could be adapted for use in the present invention. Similarly, it is not essential that hydraulic fluid be used as the pressure means by which the expansion is effected, although this has been found most convenient. Nor is it essential that an elastomer be used. If an elastomer is used, however, it is preferable that the inside and outside rims 68, 70 respectively be chamfered in order to accommodate the rim distortion resulting from pressurization. This feature provides a smooth outer plug surface and a better fluid seal along the rim surfaces during the expansion step.

Figure 4:
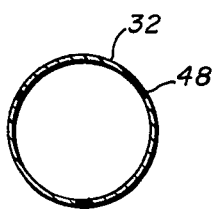
FIG. 4 is a view along the lines 4—4 of FIG. 2.
Figure 5:
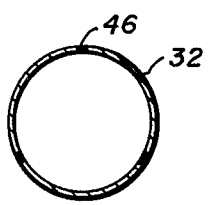
FIG. 5 is a view along the lines 5—5 of FIG. 2.

The preferred embodiment of the invention having been described, it should be understood that the step of expanding the sleeve 32 over the region 36 is not necessary under all circumstances. Expanding the sleeve over the region 36 is required only when there is reason to believe that boiling may occur between the control rod 26 and the sleeve 32 if the annulus therebetween is too narrow. The unexpanded portion 72 of the sleeve is provided with a plurality of openings 46, 48 shown in FIGS. 2, 4 and 5. The openings permit coolant to exit the sleeve 32 and flush out any crud or other deposits that may accumulate in the annulus between the sleeve 32 and the tube 12. Thus, in reactors where the neutron flux is relatively low at the top of the active fuel, none of the sleeve 32 above the crimp 34 would require expansion against the tube 12.

What is claimed is:

1. In a fuel assembly for a nuclear reactor, the reactor having a vertically reciprocable, cylindrical control rod driven from above the reactor core, the combination comprising:

a metal guide tube for telescopingly receiving the control rod and for containing an upward flow of cooling liquid therein, the tube including stop means internal to the tube at the upper end thereof, wherein the portion of the tube facing the control rod tip when the control rod is in the withdrawn position is a critical region which may be subject to wear; and a wear sleeve suspended from the stop means and extending downward through the tube below the critical region, the sleeve being made of a thin-walled, ductile metal having an inner diameter larger than the control rod outer diameter, a portion of the sleeve below the critical region being permanently outwardly deformed into interference engagement with the tube whereby longitudinal movement of the sleeve relative to the tube due to the coolant flow is prevented.

2. The fuel assembly of claim 1 wherein the tube adjacent to at least some of the permanently deformed sleeve portion is also permanently outwardly deformed.

3. The fuel assembly of claim 2 wherein the region over which the sleeve and guide tube are permanently deformed defines a crimp where the outer diameter of the sleeve is larger than the inner diameter of the guide tube on either side of the crimp.

4. The fuel assembly of claim 2 wherein the guide tube includes at its upper end a post having flared inner walls and wherein the sleeve has a conical upper end snuggly within the flared post, whereby the sleeve is vertically supported from below but may freely thermally expand longitudinally upward within the post.

5. The fuel assembly of claim 2 wherein the sleeve further includes a plurality of openings above the critical region for permitting the coolant to flush any spaces between the sleeve and the tube.

6. The assembly of claim 3 wherein the crimp is centered within about one to two inches from the lower end of the sleeve.

7. The assembly of claim 3 wherein the tube outer diameter in the crimped portion is between 0.010 to 0.035 inches greater than the tube outer diameter on either side of the crimp.

8. The fuel assembly of claim 3 wherein the sleeve has a lower portion extending from the critical region to the lower end of the sleeve and includes the crimp, the lower portion having an outer diameter substantially equal to the guide tube inner diameter at a given elevation, the sleeve further having an intermediate portion immediately above the lower portion and critical region, over which the sleeve inner diameter is less than the tube inner diameter.

9. The fuel assembly of claim 3 wherein the sleeve has a lower portion having an inner diameter substantially equal to the guide tube inner diameter and includes the crimp, and an intermediate portion having a larger diameter than the lower portion and extending between the upper end and lower portion, the lower portion extending upwardly from the lower end of the sleeve a distance sufficient to allow adequate coolant flow between the sleeve and the adjacent control rod whereby boiling therebetween is avoided.

10. The fuel assembly of claim 9 wherein the guide tube is made of Zircaloy and the sleeve is made of stainless steel.

11. The assembly of claim 10 wherein the sleeve is chrome-plated on the interior and wherein the tube outer diameter in the crimped region is between 0.010 to 0.035 inches greater than the tube outer diameter on either side of the crimp.

* * * * *